United States Patent
Farnum et al.

(10) Patent No.: US 9,108,605 B1
(45) Date of Patent: Aug. 18, 2015

(54) SECURITY AIR BRAKE LOCKING SYSTEM

(76) Inventors: Gordon Farnum, Hugoton, KS (US);
Brent Rogers, Liberal, KS (US)

( * ) Notice: Subject to any disclaimer, the term of this patent is extended or adjusted under 35 U.S.C. 154(b) by 567 days.

(21) Appl. No.: 13/439,313

(22) Filed: Apr. 4, 2012

(51) Int. Cl.
*B60T 7/20* (2006.01)
*B60T 13/26* (2006.01)

(52) U.S. Cl.
CPC . *B60T 13/263* (2013.01); *B60T 7/20* (2013.01)

(58) Field of Classification Search
CPC ........... B60T 7/20; B60T 17/16; B60T 17/18; B60T 13/263; B60T 13/662; B60T 13/683
USPC ..................................... 303/89, 123; 188/353
See application file for complete search history.

(56) References Cited

U.S. PATENT DOCUMENTS

| | | | |
|---|---|---|---|
| 3,611,287 A * | 10/1971 | Hoff et al. ..................... 307/10.4 |
| 5,145,240 A | 9/1992 | Harless et al. | |
| 5,154,493 A | 10/1992 | Futrell et al. | |
| 5,378,929 A | 1/1995 | Mor et al. | |
| 5,641,032 A | 6/1997 | Whitman | |
| 6,164,730 A | 12/2000 | Main | |
| 6,338,534 B1 * | 1/2002 | Kee et al. ........................ 303/89 |
| 6,402,261 B1 | 6/2002 | Barnett | |
| 6,634,721 B2 * | 10/2003 | Holt ................................ 303/89 |
| 6,923,509 B1 | 8/2005 | Barnett | |
| 7,091,829 B2 * | 8/2006 | Lee ........................... 340/286.12 |
| 7,406,834 B2 * | 8/2008 | Williams ......................... 62/115 |
| 2004/0201473 A1 * | 10/2004 | Lee ................................ 340/531 |
| 2010/0140358 A1 * | 6/2010 | Couck ............................ 235/487 |

* cited by examiner

*Primary Examiner* — Vishal Sahni
(74) *Attorney, Agent, or Firm* — Robert C. Montgomery; Montgomery Patent & Design (57) ABSTRACT

An air brake security locking system retains semi-trailers in a fixed position to prevent theft and is connected to an air brake line of the semi-trailer. The system includes a battery-powered valve which isolates air lines within the braking system at a low-pressure condition, thereby maintaining continuous braking of the wheels. The system includes a locked control box to secure and protect a user interface used to activate the system by entry of a numeric code using a keypad or by using a bypass key lock. A wireless remote actuation device is also utilized to activate the system from a distance. In a deactivated state, the system allows the braking system of the semi-trailer operates as normal. In an activated state, the system securely applies the spring brake units of the semi-trailer preventing movement and possible theft.

14 Claims, 6 Drawing Sheets

SECURITY AIR BRAKE LOCKING SYSTEM

RELATED APPLICATIONS

The present invention was first described in a notarized Official Record of Invention on Jan. 15, 2010, that is on file at the offices of Montgomery Patent and Design, LLC, the entire disclosures of which are incorporated herein by reference.

FIELD OF THE INVENTION

The present invention relates generally to semi-trailer wheel locking devices for use as an anti-theft measure, and in particular, to a trailer spring brake locking system for preventing movement of a semi-trailer by restricting air pressure to at least one spring brake unit to maintain the spring brake in an engaged condition.

BACKGROUND OF THE INVENTION

Security alarms are almost common items on homes, businesses, and motor vehicles in today's society. Their use has not only stopped many attempted thefts in progress, but the knowledge that they are there, has stopped many more before they are even started. However, there still remain many targets which are a favorite with thieves. One (1) of these targets is the unoccupied semi-trailer rig. It is common knowledge that most of these units do not have a power source to operate an alarm, much less a phone line that connects to a central office. These facts, coupled with their often remote location, unoccupied status, and valuable items and materials contained within, typically lead to a high percentage of thefts. In a matter of minutes, someone can simply drive up with a truck, hitch up, and drive off.

It can be difficult to add measures to prevent theft of the trailers and the contents stored inside. Even when the cargo is secured and locked, once a thief transports the trailer to another location, they are free to brake through any locks provided on the trailer. Theft of cargo in the trucking industry has risen to between $10 to $15 billion annually, and including indirect costs the annual total losses is estimated at nearly $60 billion. Due to the fact that semi-trailers are towed and rely on a tractor for power and air supply, many of the common personal vehicle security measure are not available.

Traditionally, trailer operators have used mechanical locking devices which physically prevent attachment of the trailer to a tractor or other tow vehicle. However, these devices are easily defeated and require the operator to remember to manually set the lock in order to be effective.

The trailer utilizes a spring-biased parking and emergency brake systems which require a supply of compressed air to disengage the spring brakes. The spring brake system is configured so the spring brake units are engaged by a spring force to lock the brake cylinder in response to a low pressure condition in the air brake air line and release the brakes in response to a high pressure condition when the supply of compressed air is attached. The tractor or other tow vehicle used for hauling the trailer has an air compressor that provides the supply of compressed air to the trailer through a service and emergency brake air line. The operator disconnects the brake air lines when the trailer is released from the tractor and the lines are purged to biases the spring brake to lock the wheels to prevent movement of the trailer. Since semi-trailers rely on the compressed air provided by the tractor to operate the braking systems, various theft deterrent devices have been attempted by utilizing the air brakes to prevent movement.

While many of these attempts may achieve their purported objectives, they suffer from various disadvantages and deficiencies related to design or utilization. Particularly, these devices can be costly and complicated to install and implement and utilize a variety of sensors in order to operate correctly. Additionally, failure of these devices can lead to accidental engagement of the spring brake units while the trailer is moving which can lead to disastrous accidents.

SUMMARY OF THE INVENTION

The inventor has therefore recognized the aforementioned inherent problems and lack in the art and observed that there is a need for a means by which semi-trailers can be securely locked in place to protect against theft. In accordance with the invention, it is an object of the present embodiments to solve at least one of these problems.

The inventor recognized these problems and has addressed this need by developing a bracket for a security air brake locking system that allows for increased security of unattended semi-trailers in a manner which is quick, easy and effective. The inventor has thus realized the advantages and benefits of providing a solenoid valve pneumatically interconnected between a spring brake valve of a semi-trailer and a supply of compressed air. A control circuit is provided in electrical communication with the valve for selectably actuating the valve between an open position and a closed position. A user interface is also provided in electrical communication with the control circuit for providing an open signal for actuating the solenoid valve to the open position and a close signal for actuating the solenoid valve to the closed position. A battery is provided that is in electrical communication with the control circuit and the valve for supplying a power source to both. A lockable control box is mountable to a frame of the semi-trailer for housing the control circuit and the user interface. Additionally, a plurality of lengths of durable conduit is routed upon the semi-trailer frame for protecting the wiring electrically interconnected between the battery and the control circuit and the valve. Each spring brake unit of the semi-trailer is disengaged in response to a high pressure condition and is engaged in response to a low pressure condition and the solenoid valve selectively restricts a flow of compressed air from the supply of compressed air to the spring brake valve for maintaining the low pressure condition even when an additional supply of compressed air is connected to the air brake system.

In an embodiment of the invention, the solenoid valve includes a decoy handle rigidly affixed over a manual valve actuation switch for preventing access to and actuation of the manual valve actuation switch and to confuse a prospective thief.

A method of locking the air-operated spring brake system of a semi-trailer can be achieved by pneumatically interconnecting the solenoid valve in fluid communication between the spring brake valve of the semi-trailer and the supply of compressed air. The control circuit is electrically connected to the solenoid valve for selectably actuating the solenoid valve between the open position and the closed position. The power supply is electrically connected to the solenoid valve and the control circuit. The supply of compressed air is disconnected from the spring brake system and the supply of compress air is released from the spring brake system to engage the plurality of spring brake units in response to a low pressure condition. A close signal is provided from a control circuit to the solenoid valve to actuate the solenoid valve to the close position which restricts access of a flow of compressed air to the spring brake valve in the engaged condition.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 security air brake locking system
20 valve assembly
22 valve body
24 solenoid switch
26 decoy handle
28 first pneumatic fitting
30 second pneumatic fitting
40 control box assembly
42 enclosure
44 battery box
46 battery box bracket
47 battery
48 wiring
49 charge controller
50 conduit
52 door
53 gasket
54 hinge
56 door latch
57 door latch key
58 hasp
59 keypad
60 keypad key
62 bypass lock
64 display
70 remote actuation device
72 fob housing
74 key ring
76 fob "ON" button
78 fob "OFF" button
80 control circuit board
82 wireless receiver
83 multi-conductor cable
90 wireless signal
100 semi-trailer
102 semi-trailer frame
104 fastener
105 wheel
110 spring brake unit
115 spring brake air reservoir
120 secondary air tank
125 spring brake valve
130 air line
135 DC power circuit

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 5, depicting a security air brake locking system (herein described as a "system") 10, where like reference numerals represent similar or like parts. In accordance with the invention, the present disclosure describes a system 10 by which semi-trailers 100 can be securely retained in a parked position by features added to an original-equipment air braking system of the semi-trailer 100, thereby minimizing the risks of theft of the semi-trailer 100.

The system 10 generally includes an electric solenoid valve assembly 20 which isolates a spring brake valve 125 and the spring brake emergency braking system of the semi-trailer 100. The valve assembly 20 prevents a supply of compressed air from being connected in fluid communication with the emergency air brake system of the trailer 100 in order to prevent charging the spring brake system air lines 130. When a supply of compressed air is connected to the spring braking system, the air pressure disengages the spring brake unit 110 allowing for the trailer 100 to move. Releasing this air pressure engages the spring brake units 110 at each wheel 105 locking the wheels and preventing movement of the trailer 100.

The system 10 also includes a secure control box assembly 40 which is used to activate the solenoid valve assembly 20 and a wireless remote actuation device 70 to control the functions of the system 10. The system 10 allows the semi-trailer 100 to operate in a normal manner until activation of the valve assembly 20 which maintains braking to prevent movement of the semi-trailer 100.

Figure 1:
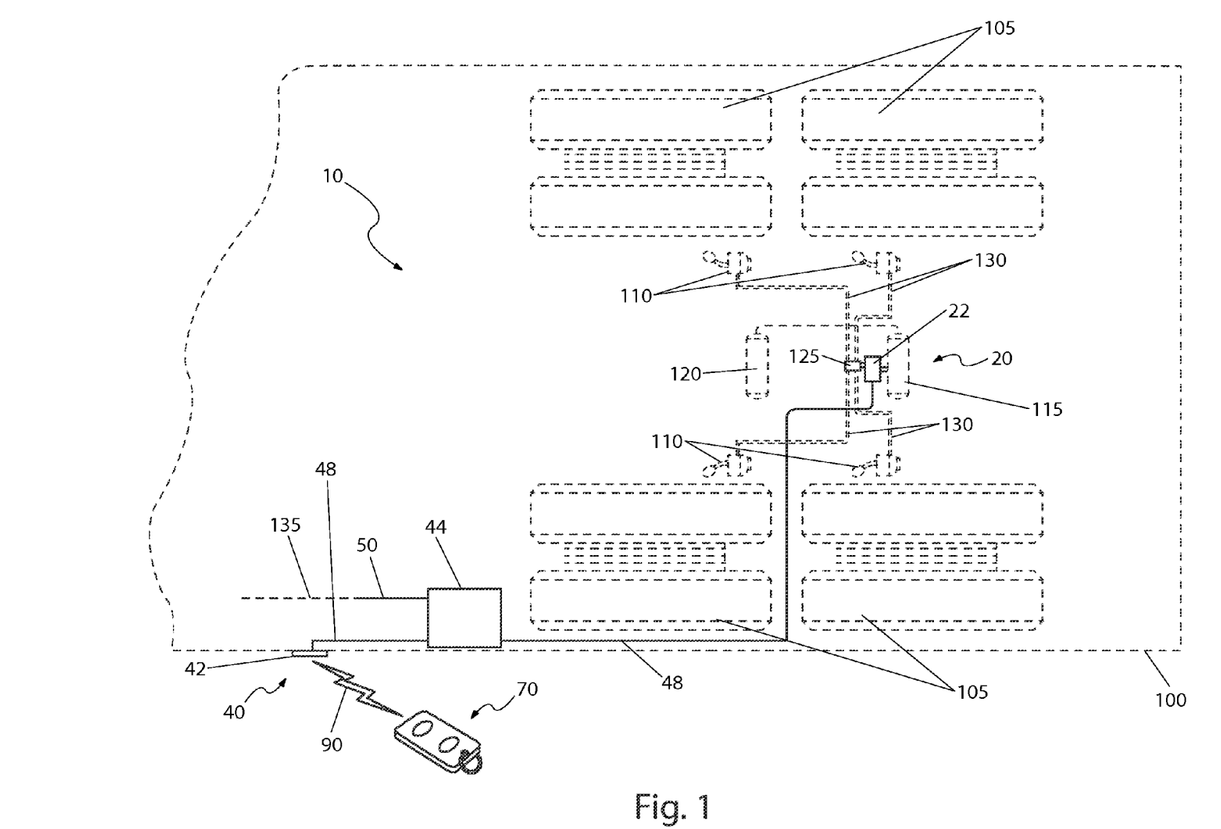
FIG. 1 is a bottom view of a security air brake locking system depicted as installed upon a semi-trailer, according to a preferred embodiment in accordance with the invention.

FIG. 1 shows a bottom environmental view of the system 10 depicting installation upon the semi-trailer 100. The system 10 is depicted as integrated into an existing spring brake, emergency braking line of the air brake system of the semi-trailer 100; however, it can be appreciated by one skilled in the art that the major components of the system 10 can be integrated into new trailer 100 designs with equal benefit to an end user and as such should not be interpreted as a limiting factor of the system 10. FIG. 1 only depicts the supply lines of the spring brake units 110 and does not show the service line of the air braking system for clarity of disclosure. The valve assembly 20 is installed between a spring brake air reservoir 115 and a spring brake valve 125 of the emergency braking system to create a low-pressure air condition within the air lines 130 that are routed to each spring brake unit 110 (see FIG. 2).

The valve assembly 20 includes an electrically-operated solenoid valve in electrical communication with the control box assembly 40 by electrical wiring 48. The valve assembly 20 is preferably mounted along an exterior side surface of the semi-trailer 100 using mechanical fasteners, such as screws. In a deactivated state the system 10 allows the brake units 110 of the semi-trailer 100 to operate in a normal manner. Upon activation of the system 10, the solenoid valve 20 retains air within a spring brake air reservoir 115 to maintain a low-pressure condition within braking units 110 to prevent movement of the semi-trailer 100. Electrical power to the solenoid valve assembly 20 and control box 40 is supplied in a continuous manner whether or not the semi-trailer 100 is connected to a semi-tractor by a DC battery 47.

Figure 4:
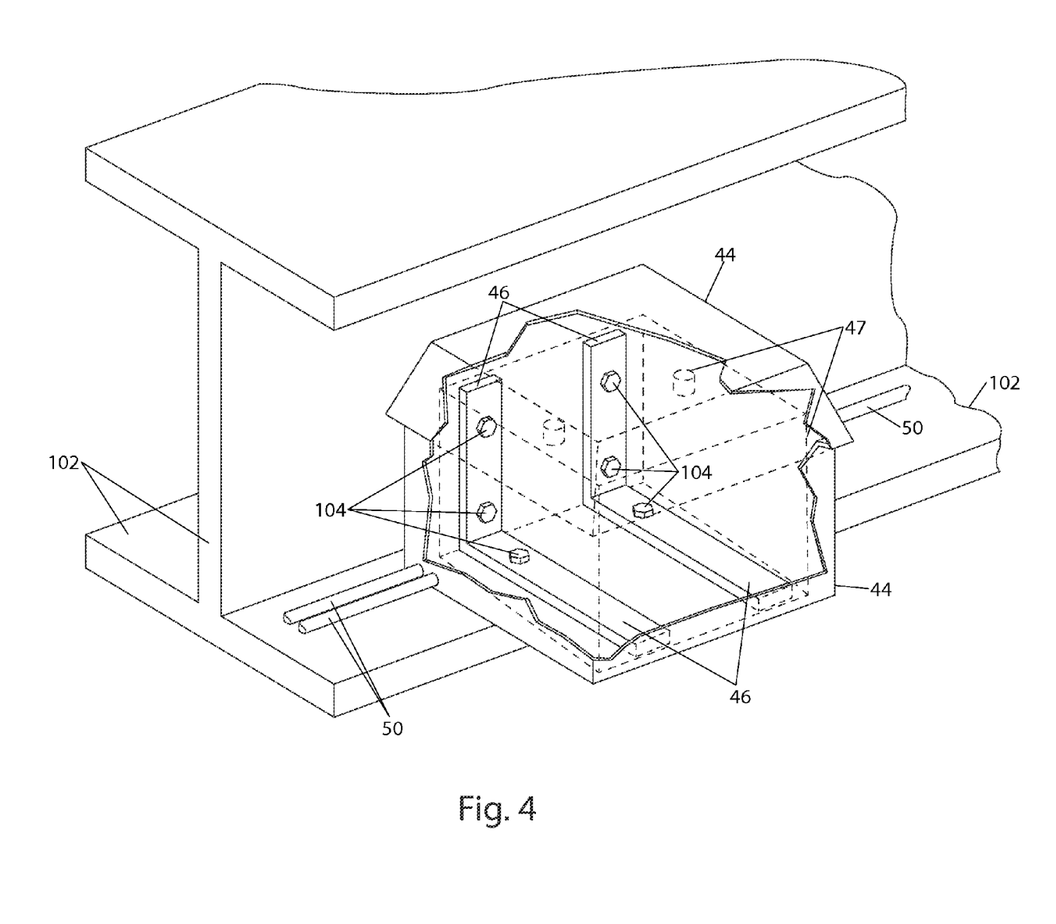
FIG. 4 is a partial cutaway view of a battery box of the security air brake locking system, according to the preferred embodiment; and, FIG. 5 is an electrical block diagram depicting the major electrical components of the security air brake locking system, according to the preferred embodiment.

The battery 47 is secured within an exterior waterproof battery box 44 mounted to a semi-trailer frame 102 in a rugged manner using brackets 46 and mechanical fasteners 104 (see FIG. 4). The DC battery 47 receives a charging current from a DC power circuit 135 connected to a clearance light or the like. Charging of the battery 47 takes place during periods when the semi-trailer 100 is connected to a semi-tractor.

Figure 2:
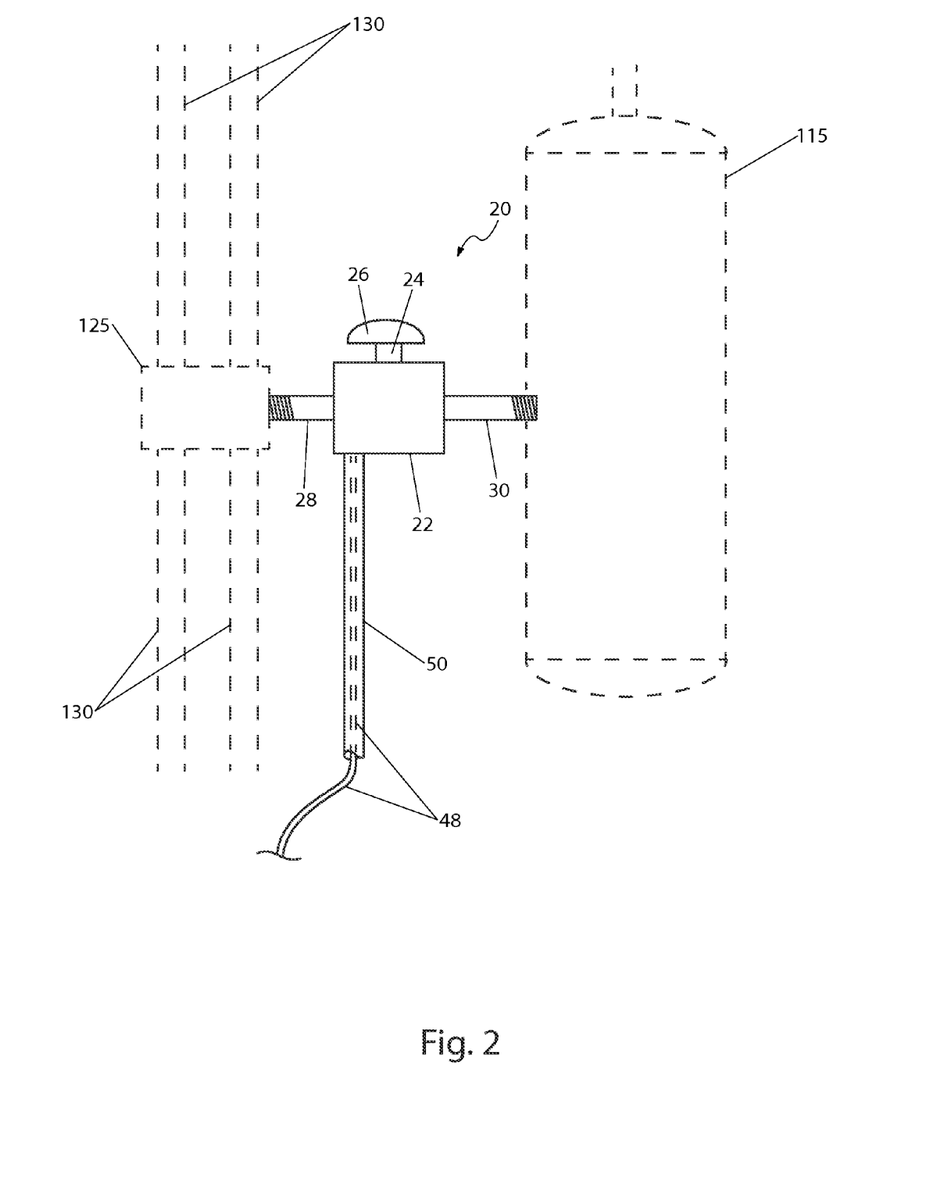
FIG. 2 is a close-up view of a valve assembly depicted as integrated into the semi-trailer air brake system, according to a preferred embodiment.

FIG. 2 shows a close-up view of a valve assembly 20 integrated into an existing air brake system. The valve assembly 20 isolates the spring brake units 110 from pressurized air from the spring brake air reservoir 115 or other source of compressed air, such as from the air compressor of a tractor. This isolation maintains an active braking condition of the spring brake units 110 by maintaining a low pressure condition to engage the spring brake units 110.

The valve assembly 20 includes a valve body 22, an electromagnetic solenoid switch 24, a decoy handle 26, a first pneumatic fitting 28, and a second pneumatic fitting 30. The first pneumatic fitting 28 and second pneumatic fitting 30 each includes a high-pressure threaded nipple-type fitting which allows the solenoid valve assembly 20 to be installed between the spring brake air reservoir 115 or hose connection of the service line compressed air supply and the spring brake valve 125 in an in-line manner. It can be appreciated by one skilled in the art that various arrangements of air plumbing may be required based upon particular installation and as such should not be interpreted as a limiting factor of the system 10.

The decoy handle 26 includes a domed push button shape permanently affixed upon the solenoid switch 24 using molding, fastening, gluing, or the like, to securely conceal the solenoid switch 24 and to protect the system 10 from being tampered with. Electrical power to the solenoid valve 20 is supplied from the battery 47 by electrical wiring 48 routed from the battery box 44 and securely protected using metal conduit 50 (see FIGS. 1 and 4).

Figure 3A:
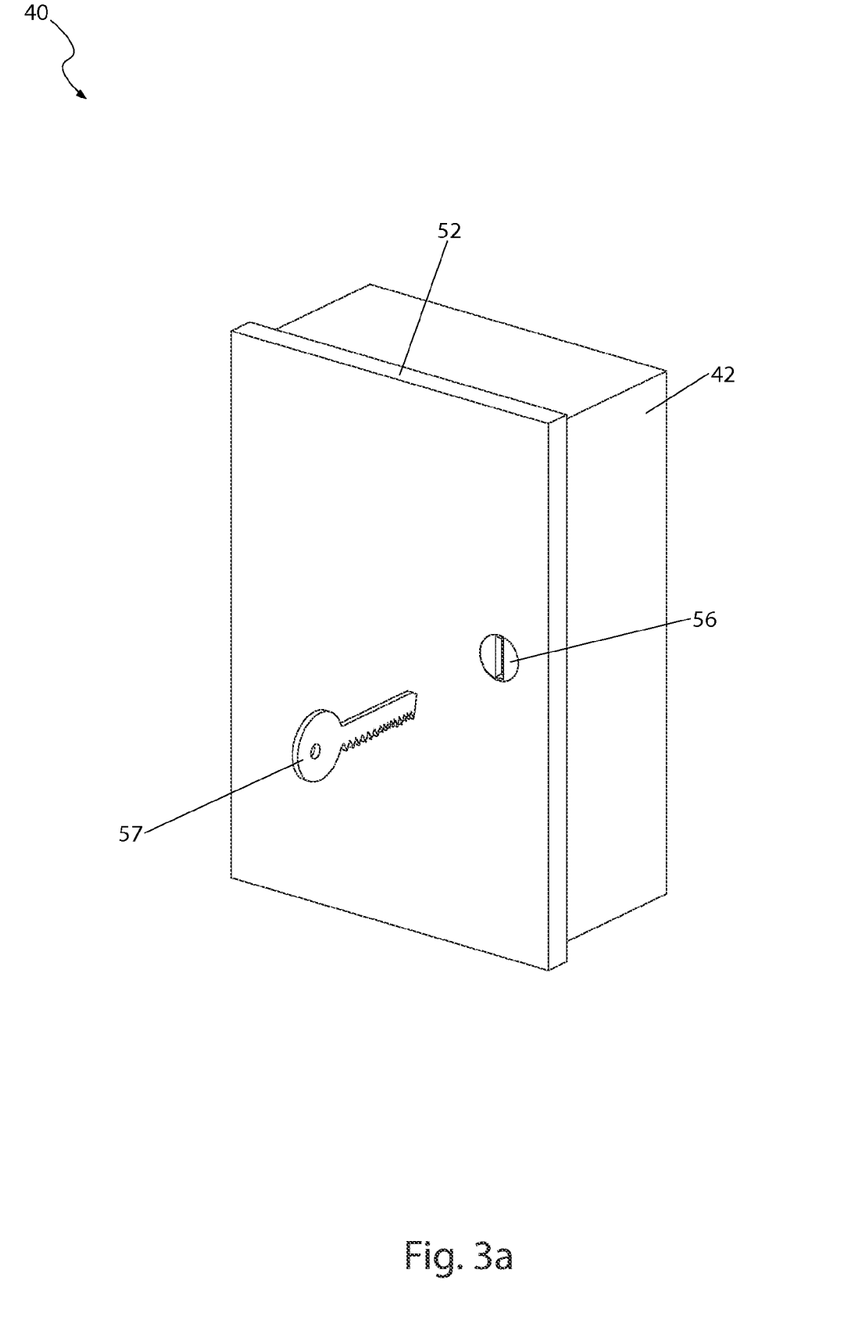
FIG. 3a is a perspective view of a control box assembly depicted in a closed state, according to the preferred embodiment.
Figure 3B:
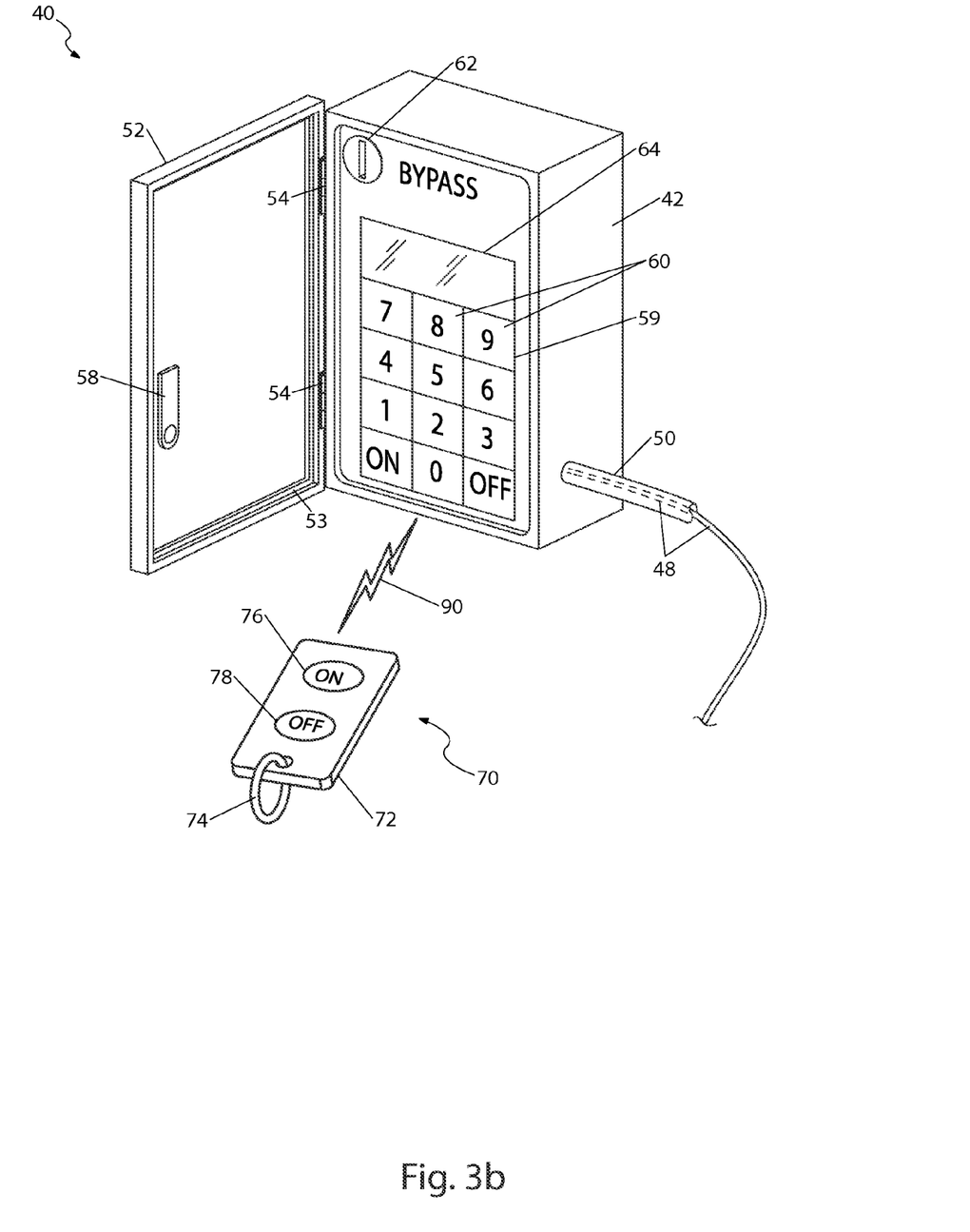
FIG. 3b is a perspective view of the control box assembly depicted in an open state, according to the preferred embodiment.

FIGS. 3a and 3b show perspective views of a control box assembly 40 depicted in a closed state and an open state, respectively. The control box assembly 40 includes a waterproof and rugged composite plastic or metal enclosure 42 having a locking door 52 which is securely mounted to a lower side edge of the semi-trailer 100 or similarly accessible location to provide easy access for an operator. The control box assembly 40 includes electrical circuitry that is in electrical communication with the battery box 44 and the solenoid valve assembly 20 by wiring 48 that is routed discreetly along chassis portions of the semi-trailer 100 within a protective tubular conduit 50. The control box assembly 40 provides protective containment of various electrical and electronic components necessary for the operation and security of the system 10 (see FIG. 5).

The control box assembly 40 includes a pair of integrally molded or fastened axial hinges 54 that provide an attachment of the door 52 to the enclosure 42. The hinges 54 are arranged along a common axis between the door 52 and the enclosure 42 and are positioned upon a forward-facing side edge to allow the door 52 to rotate to one side. The door 52 further includes a locking door latch 56, a door latch key 57, and a rectangular-shaped interior perimeter gasket 53 which provides a weatherproof, rubberized seal 53. The gasket 53 is positioned between the door 52 and the enclosure 42 to seal contacting surfaces together upon closing of the door 52.

The door latch 56 is operated externally using the door latch key 57 and includes a half-turn panel-mounted door latch 56 having an adjoined interior hasp 58 to engage an edge of the enclosure 52 opposite the hinges 54. The enclosure 42 contains user interface features which include a keypad 59, a key-operated bypass lock 62, and a digital display 64. The bypass lock 62 allows an operator to immediately activate the brake locking function using the latch key 57 without manually entering a numeric code or a personal identification number (PIN) on the keypad 59. The keypad 59 includes a plurality of keypad keys 60 having numeric indicia including an "ON" and "OFF" function identification to provide manual activation and deactivation of the system 10 through the keypad 59 interface. The display 64 is capable of indicating a status of the system 10 as well as data entered using the keypad keys 60 and is preferably fabricated from an LCD-type display or equivalent display technology.

Figure 5:
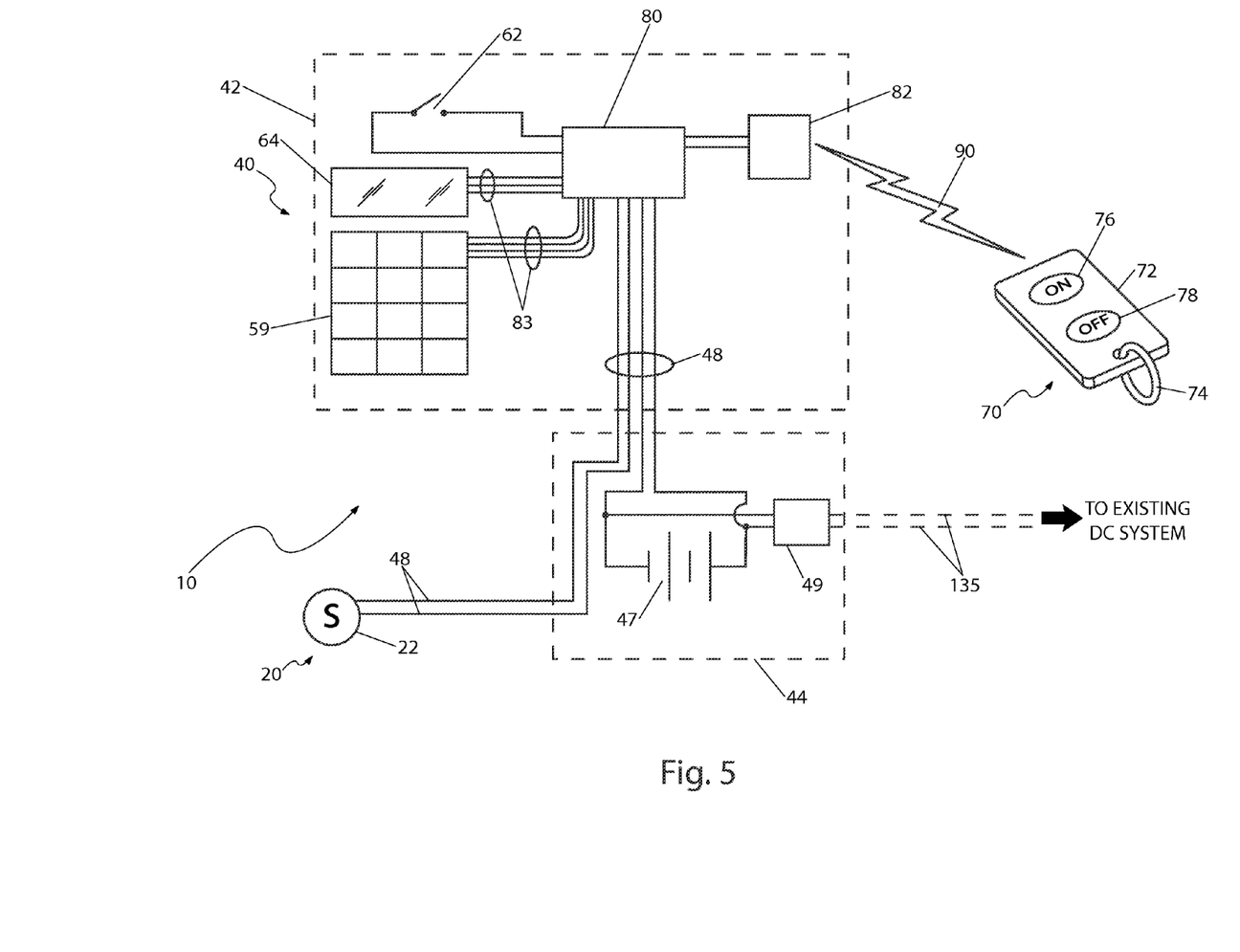

The control box assembly 40 also provides a way to wirelessly activate the system 10 from a remote location using a hand-held wireless control remote actuation device 70 capable of transmitting a wireless signal 90 from a distance to a receiver 82 within the enclosure 40 and in electrical communication with the control circuitry (see FIG. 5). The remote actuation device 70 includes a durable rectangular plastic fob housing 72, a key ring 74, a fob "ON" button 76, and a fob "OFF" button 78. The wireless signal 90 transmitted by the remote actuation device is a one-way signal and does not provide for duplex communication or confirmation of a received wireless signal 90. The wireless signal 90 includes a frequency modulated (FM) frequency authorized for such use; however, other methods of modulation such as amplitude modulation, single side band, digital, continuous wave and the like would work equally well, and as such, should not be interpreted as a limiting factor of the system 10.

FIG. 4 shows a perspective view of a battery box 44 of the security air brake locking system 10. The battery box 44 includes a pair of internal "L"-shaped support brackets 46 affixed to the semi-trailer frame 102 using mechanical fasteners 104, such as bolts, screws, or the like. The battery box 44 is fabricated from plastic or metal having a water resistant or waterproof construction with sufficient internal space to contain the battery 47 and the charge controller 49.

FIG. 5 shows an electrical block diagram depicting the major electrical components of the system 10. The system 10 includes a voltage regulating charge controller 49, the battery 47, a control circuit board 80, and the receiver 82. The battery 47 is a deep-cycle type unit similar to those used in marine applications to provide durability over repeated discharge cycles. The battery 47 receives a charging current during times when the semi-trailer 100 is hooked to a semi-tractor by connection to a DC power circuit 135, such as a clearance light wire or the like. The battery charging current is regulated by the electronic charge controller 49 mounted within the battery box 44. The battery box 44 is mounted to the lower semi-trailer frame 102 using the pair of battery box brackets 46 and fasteners 104. The system 10 is depicted here having wiring 48 routed from the solenoid valve assembly 20 and the control box assembly 40 and into and through the battery box 44; however, it can be appreciated that various wiring 48 configurations and arrangements can be provided based upon particular semi-trailer 100 layout, installation, and user's preferences and as such should not be interpreted as a limiting factor of the system 10.

The control box assembly 40 provides protective enclosure of a control circuit board 80 and a signal receiver 82. The control circuit board 80 includes a printed circuit board (PCB) having on-board electronic components necessary for the operation of the system 10 such as, but not limited to: microprocessors, memory chips, relays, embedded software, input and output signal capabilities (I/O), driver circuits, wiring connections, and a pair of multi-conductor cables 83. The multi-conductor cables 83 provide connection and communication with the keypad 59 and the digital display 64. The control circuit board 80 receives user generated input signals from the keypad 59 and the bypass lock 62 to activate the braking function of the system 10. The control circuit board 80 in turn provides an output signal to the display 64 as well as an output current to the solenoid valve assembly 20 to activate the braking function of the system 10.

Additionally, the control circuit board 80 receives the input signal from the receiver 82 upon receipt of the wireless signal 90 from the control remote actuation device 70, thereby providing remote initiation of the braking function of the system 10.

It can be appreciated by one skilled in the art that other styles and configurations of the invention can be easily incorporated into the teachings of the present disclosure and only one particular configuration has be shown and described for purposes of clarity and disclosure and not by way of limitation of scope.

In accordance with the invention, the preferred embodiment can be utilized by the user in a simple and effortless manner with little or no training. After initial purchase or acquisition of the device 10, it is installed and utilized as indicated in FIGS. 1 through 5.

The method of installing the system 10 upon a semi-trailer 100 can be achieved by performing a series of steps including the following. Procuring a model of the system 10 which is particularly suited to the semi-trailer 100 onto which the system 10 is to be installed. Installing the valve assembly 20 between the spring brake air reservoir 115 and the spring brake valve 125 using the first pneumatic fitting 28 and second pneumatic fitting 30 using plumbing methods. Performing any necessary air line 130 modifications as needed. Mounting the battery box 44 along the lower semi-trailer frame 102 of the semi-trailer 100 using the battery box brackets 46 and fasteners 104. Mounting the control box assembly 40 along the lower side surface of the semi-trailer 100 using the fasteners 104. Installing a charged battery 47 within the battery box 44 and installing wiring conduit 50 along the chassis of the semi-tractor 100 to provide a protective wire routing and electrical interconnection between the valve assembly 20, the control box assembly 40, the battery 47, and a DC power circuit 135. Routing wiring 48 through the conduit 50 and securing all wiring 48 connections.

The method of utilizing the installed system 10 can be achieved by performing a series of steps including the following. Accessing inner portions of the control box assembly 40 by inserting the door latch key 57 into the latch 56 of the control box door 52. Rotating the latch key 57 and unlocking the latch 56 and opening the door 52 to access the keypad 59 and bypass lock 62 of the control box assembly 40. Utilizing the keypad 59 to activate the braking function of the system 10 by entering a secure code or PIN number using the numeric keypad keys 60. Pressing an "ON" keypad key 60 to activate the braking function of the system 10 and locking the door 52 of the control box assembly 40 using the door latch key 57. Using the door latch key 57 to lock the latch 56 of the door 52 to secure the system 10 in the activated state. Deactivating the braking function of the system 10 after a desired period of activation by accessing the keypad 59 as previously described and pressing the "OFF" keypad key 60.

An operator can alternately activate the system 10 by opening the door 52 as previously described and inserting the door latch key 57 into the bypass lock 62. Turning the door latch key 57 to bypass manual entry of the code or PIN number and pressing the "ON" or "OFF" keypad key 60 as needed to activate or deactivate the system 10.

Furthermore, the operator can also remotely activate the system 10 from a distance using the hand-held remote actuation device 70 by pressing the fob "ON" button 76 or the fob "OFF" button 78, thereby transmitting the wireless signal 90 to respectively activate or deactivate the braking function of the system 10.

An alternative embodiment of the system 10 includes integration of the major components of the system 10 into a new semi-trailer design as an original equipment or optional equipment portion.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A security air brake locking system comprising:
  a valve in fluid communication between a spring brake valve of a semi-trailer and a supply of compressed air, said valve comprising a valve body and a solenoid manual valve actuation switch, comprising:
    a first pneumatic fitting at a valve outlet for pneumatic connection to said spring brake valve;
    a second pneumatic fitting at a valve inlet for pneumatic connection to said supply of compressed air; and,
    an electromechanical valve;
  a decoy handle rigidly affixed to said valve body over top of said solenoid switch and concealing said solenoid manual valve actuation switch to prevent access thereto and actuation thereof;

a control circuit in electrical communication with said valve for selectably actuating said valve between an open position and a closed position; and, a battery in electrical communication with said control circuit and said valve for supplying a power source;

wherein a plurality of spring brake units of said semi-trailer is disengaged in response to a high pressure condition and is engaged in response to a low pressure condition;

wherein said valve selectively restricts a flow of compressed air from said supply of compressed air to said spring brake valve for maintaining said low pressure condition.

2. The system of claim 1, further comprising:
a pair of rigid L-shaped brackets connected to said trailer; and
a battery box connected to said brackets for securing said battery.

3. The system of claim 1, further comprising a lockable control box mountable to said frame of said semi-trailer for housing said control circuit.

4. The system of claim 3, wherein said control box further comprises:
an enclosure having an hollow interior for housing electrical components of said control circuit;
a door hingedly attached to said enclosure; and,
a key operated latch for locking said door in a shut position covering said control circuit.

5. The system of claim 4, wherein said control box further comprises a gasket disposed around an interior perimeter of said door for providing a water resistance seal between said door and said enclosure when in said shut position.

6. The system of claim 1, wherein said control circuit further comprises a user interface for selectably controlling electrical actuation of said valve between said open position and said closed position.

7. The system of claim 6, wherein said user interface further comprises:
a keypad for actuating said valve in response to entering a personal identification number;
a key-operated bypass lock for actuating said valve in response to turning of a key; and,
a digital display for visually displaying an actuation position of said valve.

8. The system of claim 6, wherein said control circuit further comprises a wireless receiver for receiving a wireless signal transmitted from a remote actuation device for actuating said valve in response to said wireless signal.

9. The system of claim 1, wherein said battery is rechargeable when in electrical connection with a direct current power supply.

10. The system of claim 1, further comprising a plurality of lengths of durable conduit for protecting wiring electrically interconnected between said battery and said control circuit and said valve.

11. A security air brake locking system comprising:
a solenoid valve pneumatically interconnected between a spring brake valve of a semi-trailer and a supply of compressed air, said solenoid valve comprising a valve body and a solenoid manual actuation switch;
a decoy handle rigidly affixed to said valve body of said solenoid valve over top of and concealing said solenoid manual actuation switch to prevent access to and actuation of said solenoid manual actuation switch;
a control circuit in electrical communication with said solenoid valve for selectably actuating said valve between an open position and a closed position;
a user interface in electrical communication with said control circuit for providing an open signal for actuating said solenoid valve to said open position and a close signal for actuating said solenoid valve to said closed position;
a battery in electrical communication with said control circuit and said solenoid valve for supplying a power source;
a lockable control box mountable to a frame of said semi-trailer for housing said control circuit and said user interface; and,
a plurality of lengths of durable conduit for protecting wiring electrically interconnected between said battery and said control circuit and said valve;
wherein a spring brake unit of said semi-trailer is disengaged in response to a high pressure condition and is engaged in response to a low pressure condition;
wherein said solenoid valve selectively restricts a flow of compressed air from said supply of compressed air to said spring brake valve for maintaining said low pressure condition.

12. The system of claim 11, wherein said user interface further comprises:
a keypad for actuating said solenoid valve in response to entering a personal identification number; and,
a digital display for visually displaying an actuation position of said solenoid valve.

13. The system of claim 12, wherein said user interface further comprises a key-operated bypass lock for actuating said solenoid valve in response to turning of a key.

14. The system of claim 13, wherein said control circuit further comprises a wireless receiver for receiving a wireless signal transmitted from a remote actuation device for actuating said solenoid valve in response to said wireless signal.

* * * * *